United States Patent [19]
Slavin

[11] Patent Number: 5,644,974
[45] Date of Patent: Jul. 8, 1997

[54] AUTOMATIC RESETTING HEAT REDUCTION ASSEMBLY FOR TOASTER APPLIANCE

[75] Inventor: Timothy J. Slavin, Columbia, Mo.

[73] Assignee: Toastmaster, Inc., Columbia, Mo.

[21] Appl. No.: 752,574

[22] Filed: Nov. 21, 1996

[51] Int. Cl.$^6$ .............................. A47J 37/08; H05B 1/02; H05B 3/06
[52] U.S. Cl. .............. 99/328; 99/326; 99/329 P; 99/329 RT; 99/389; 99/391; 99/401; 219/481; 219/489; 219/492; 219/521
[58] Field of Search ............................ 99/325–335, 372, 99/385, 388, 389–392, 400, 401; 219/481, 489, 492, 518, 520, 512, 521, 396, 398, 413, 414; 392/375, 373, 407

[56] References Cited

U.S. PATENT DOCUMENTS

| | | | |
|---|---|---|---|
| 3,229,614 | 1/1966 | Matzenauer | 99/327 |
| 3,587,025 | 6/1971 | Dokos et al. | 337/333 |
| 3,828,559 | 8/1974 | Siemensma | 60/529 |
| 4,110,600 | 8/1978 | Spotts et al. | 219/486 X |
| 4,201,124 | 5/1980 | Huggler | 99/327 |
| 4,216,372 | 8/1980 | Huggler | 219/521 |
| 4,296,312 | 10/1981 | Salem | 219/501 |
| 4,382,175 | 5/1983 | Huggler | 99/329 R |
| 4,394,563 | 7/1983 | Schnell | 392/373 |
| 4,455,319 | 6/1984 | Clark | 99/447 |
| 4,518,849 | 5/1985 | Rolland | 219/492 |
| 4,580,853 | 4/1986 | Hitzeroth et al. | 312/245 |
| 4,906,818 | 3/1990 | Lumpp et al. | 219/518 X |
| 5,156,637 | 10/1992 | Wai-Ching | 99/388 |
| 5,193,439 | 3/1993 | Finesman et al. | 99/327 |
| 5,385,082 | 1/1995 | Huggler et al. | 99/328 |
| 5,397,510 | 3/1995 | Clark | 219/521 |
| 5,463,936 | 11/1995 | Clark et al. | 99/327 |

OTHER PUBLICATIONS

Toastmaster–2–Slice Toaster Use and Care Guide for Models B720, B712, B710, date unknown.

*Primary Examiner*—Timothy F. Simone
*Attorney, Agent, or Firm*—Stinson, Mag & Fizzell

[57] ABSTRACT

An electric toaster having an automatic resetting heat reduction assembly. The toaster includes one or more cavities to receive bagels, bread, or other food products, and a plurality of heating elements located within the cavities to toast the food products. A carriage assembly movable between a raised nontoasting position and a lowered toasting position lowers and raises the food products into and out of the toasting cavities. When lowered to the toasting position, the carriage assembly activates a heat activation assembly which completes an electrical circuit between a power source and the heating elements, thereby energizing the heating elements to toast the food products. The toaster also includes a heat reduction assembly settable between an original full heat position and a depressed reduced heat position. When the heat activation assembly is activated and the heat reduction assembly is in the original full heat position, the heating elements are energized wherein all of the heating elements operate at full heat such that both sides of the food products are evenly toasted. When the heat activation assembly is activated and the heat reduction assembly is moved to the depressed reduced heat position, the heating elements are energized wherein selected heating elements operate at full heat and other selected heating elements operate at a reduced heat such that one side of the food products is toasted more than the other side. The heat reduction assembly automatically resets to the original full heat position at the end of a toasting cycle.

21 Claims, 5 Drawing Sheets

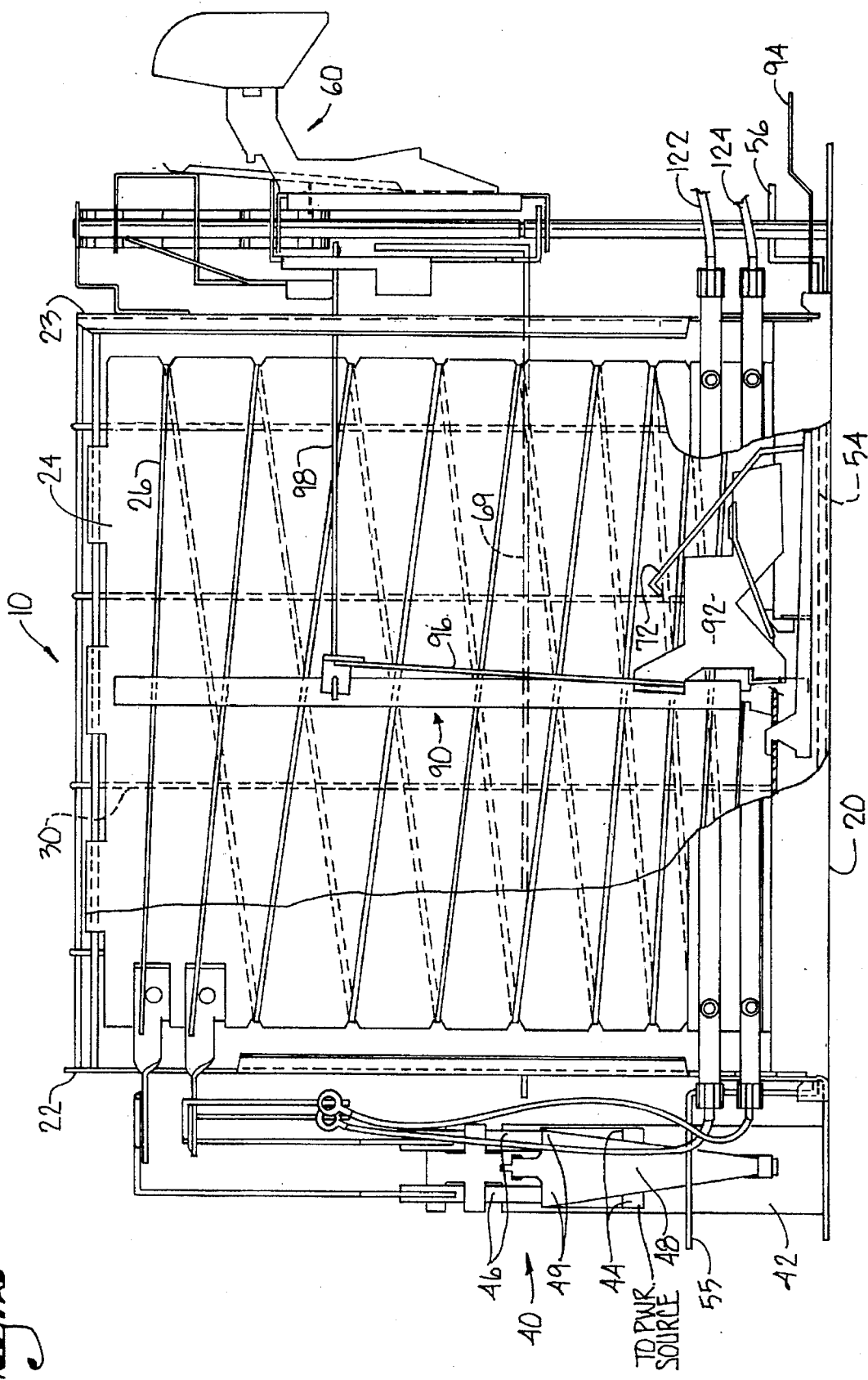

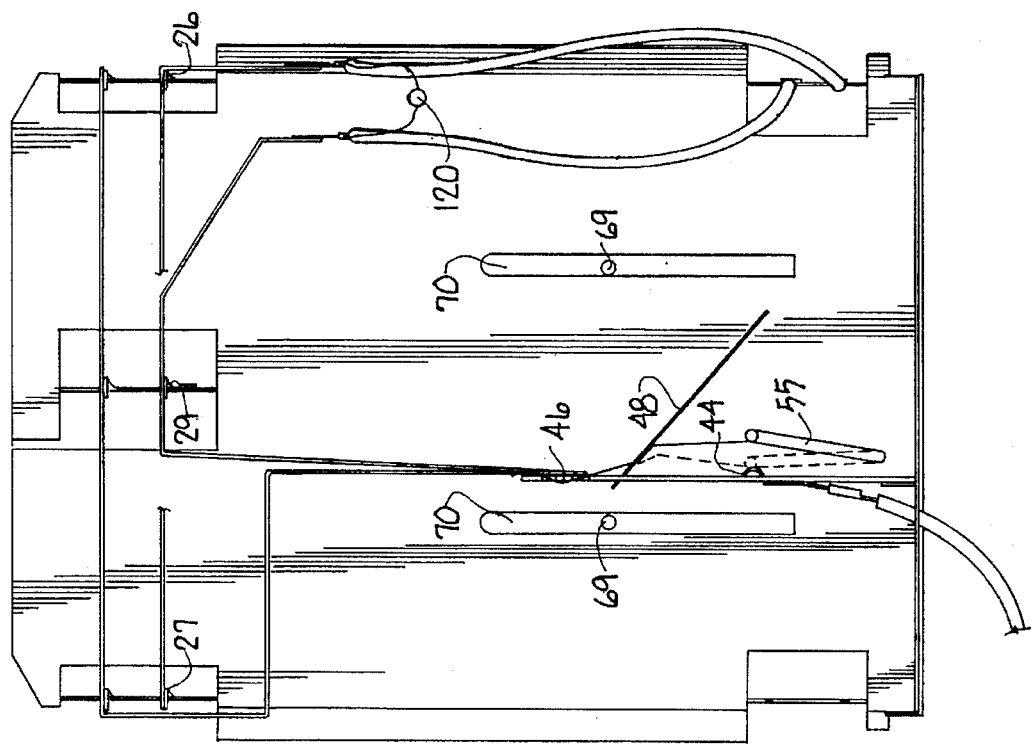

AUTOMATIC RESETTING HEAT REDUCTION ASSEMBLY FOR TOASTER APPLIANCE

FIELD OF THE INVENTION

The present invention relates in general to electric food preparation appliances and, more particularly, to an improved toaster appliance having an automatic resetting heat reduction assembly.

BACKGROUND OF THE INVENTION

Electric toasters which provide for the toasting of bread and other food products have been commonly employed for numerous years. Such toasters include one or more cavities to receive the bread to be toasted, and a plurality of heating elements located within the cavities to toast the bread. Such toasters also include a carriage assembly having a handle which can be selectively moved between an up position and a down position to move the bread into and out of the toasting cavities. When the handle is moved to the down position, the carriage assembly activates a switch which completes an electrical circuit between a power source and the heating elements, thereby energizing the heating elements to toast the bread. In use, the heating elements heat a slice of bread such that both sides are evenly toasted.

Electric toasters which additionally provide for the toasting of pastries, bagels, and other food products have also been employed for many years, such as a toaster manufactured by the applicant since the late 1970's. Such toasters have a design similar to the toasters of the above-described type; however, they also include a heat reduction assembly having a lever which can be selectively moved between a "toast" full heat position and a "pastry" reduced heat position.

When the handle is moved to the down position and the lever is moved to the "toast" full heat position, the heat reduction assembly maintains the electrical circuit between the power source and the heating elements wherein all of the heating elements operate at full heat. In use, the heating elements heat, for example, a slice of bread such that both sides are evenly toasted.

When the handle is moved to the down position and the lever is moved to the "pastry" reduced heat position, the heat reduction assembly modifies the electrical circuit between the power source and the heating elements wherein selected heating elements operate at full heat and selected heating elements operate at a reduced heat. In use, the heating elements heat, for example, a sliced bagel such that the "cut" side is toasted and the other side is only warmed. At the end of the toasting cycle, the lever remains in the reduced heat position. Therefore, on the next toasting cycle, if a user wants to toast bread or other food products on both sides, he has to remember to move the lever back to the full heat position. In actual practice, it has been found that many users fail to move the lever back to the full heat position, resulting in toasting on one side and warming on the other.

SUMMARY OF THE INVENTION

Accordingly, it is an object of the present invention to provide a new and improved toaster which is easy to use and eliminates undesired toasting results.

Another object of the present invention is to provide a new and improved heat reduction assembly.

A further object of the present invention is to provide a heat reduction assembly which is movable between an original full heat position and a depressed reduced heat position and which automatically resets to the original full heat position at the end of the toasting cycle.

These and other objects are achieved by a toaster which includes one or more cavities to receive bagels, bread, or other food products to be toasted. Located within each cavity is a vertically moveable support upon which the food product rests. The support is connected to a carriage assembly having a heat activation grip which can be selectively moved between a raised nontoasting position and a lowered toasting position. The carriage assembly is biased toward the raised nontoasting position, and can be latched in the lowered toasting position. Also located within each cavity are heating elements which are energized when the heat activation grip is moved to the lowered toasting position, thereby activating a heat activation assembly which completes an electrical circuit between a power source and the heating elements.

The toaster also includes a heat reduction assembly having a snap action switch, an actuator arm, and a heat reduction control having a heat reduction grip which can be selectively moved between an original full heat position and a depressed reduced heat position. The heat reduction assembly is biased toward the original full heat position, and can be latched in the depressed reduced heat position. When the heat activation grip is moved to the lowered toasting position and the heat reduction grip is in the original full heat position, the snap action switch maintains the electrical circuit between the power source and the heating elements wherein all of the heating elements operate at full heat such that a food product is evenly toasted on both sides. When the heat activation grip is moved to the lowered toasting position and the heat reduction grip is moved to the depressed reduced heat position, the carriage assembly engages the actuator arm which thereby actuates the snap action switch. When actuated, the snap action switch modifies the electrical circuit between the power source and the heating elements wherein selected heating elements operate at full heat and selected heating elements operate at a reduced heat such that one side of a food product is toasted more than the other side. Upon completion of a toasting cycle, the carriage assembly returns to the raised nontoasting position, the actuator arm is disengaged, and the heat reduction assembly automatically resets to the original full heat position.

The subject matter represented by the invention, as well as the objects thereof, will become apparent from the detailed description of the invention, the accompanying drawings, and the appended claims.

BRIEF DESCRIPTION OF THE DRAWINGS

FIG. 2 is a front, fragmentary view of the toaster of FIG. 1 with the housing removed and a portion of the side wall removed.

FIG. 8 is an elevational view of the left end of the toaster of FIG. 2.

DETAILED DESCRIPTION OF THE INVENTION

Figure 1:
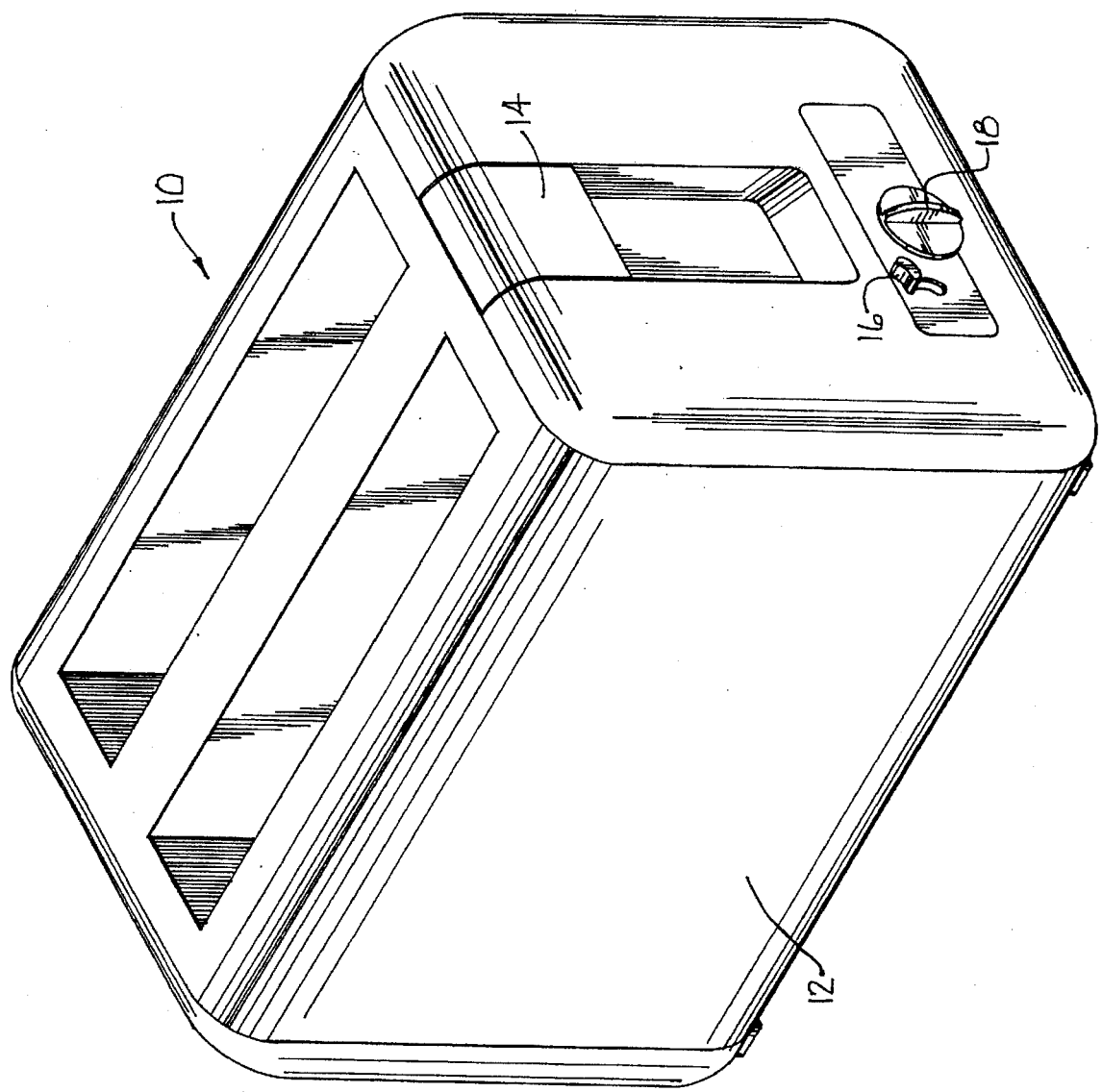
FIG. 1 is a perspective view of an assembled toaster according to the present invention.

With reference to FIG. 1, a toaster according to the present invention is generally designated by reference numeral 10.

The toaster 10 includes a housing 12 which substantially surrounds the operative components of the present invention. Upon the exterior of the housing 12 are mounted appropriate manual controls, such as a heat activation grip 14, a heat reduction grip 16, and a darkness control grip 18.

With reference to FIG. 2, the lower portion of the toaster 10 is formed by a bottom frame 20 which is substantially planar and horizontal in use. The bottom frame 20 may include a pull-out crumb tray to aid in cleaning the interior of the toaster.

The toaster 10 includes a first end wall 22 and a second end wall 23. The end walls 22 and 23 are substantially planar and vertical in use, and are longitudinally spaced from each other along the bottom frame 20. The end walls 22 and 23 are mounted to the bottom frame 20.

A first side wall 24 and a second side wall 25 (not shown) are also mounted to the bottom frame 20. The side walls 24 and 25 mount electrical resistance heating elements 26 and 27 to direct heat laterally inward. The side walls 24 and 25, together with the end walls 22 and 23 and the bottom frame 20, complete a single cavity for the toaster 10.

If further cavities are desired for further food products, there may be disposed one or more center walls 28 (not shown) between the side walls 24 and 25. The center walls 28 thus subdivide the area between the side walls 24 and 25 creating further cavities (for example, a single center wall creates two cavities). The center wall 28 mounts an electrical resistance heating element 29, with the heating element 29 extending along both faces of the center wall 28 to provide heat to each of the cavities formed by the center wall 28. The side walls 24 and 25 and center wall 28 are of course formed of suitable material to withstand the heat of the heating elements 26, 27, and 29.

The side walls 24 and 25 and center wall 28 are also provided with a plurality of vertically elongated bread guards 30 spaced laterally outward from the heating elements 26, 27 and 29 to prevent contact between the food products and the heating elements 26, 27 and 29.

Figure 3:
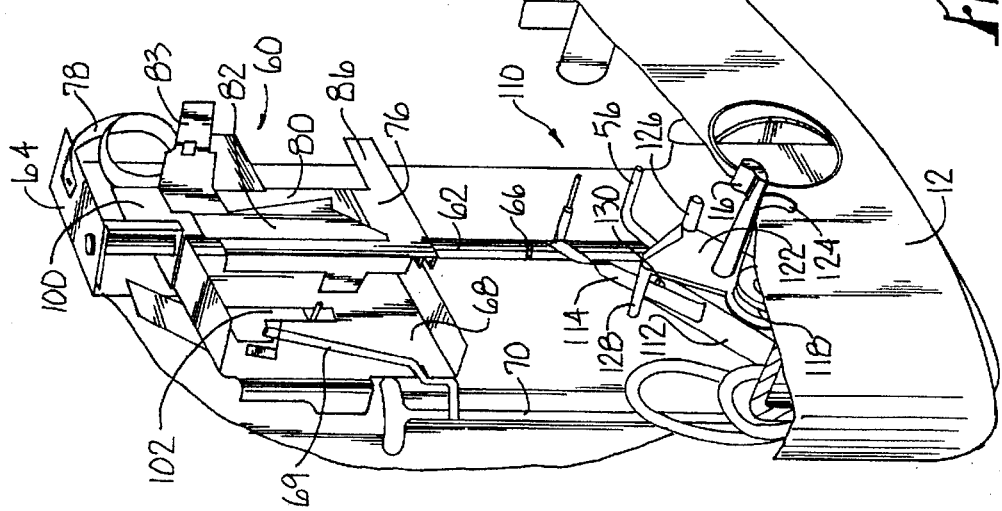
FIG. 3 is a perspective view of the right end of the toaster of FIG. 2 including a carriage assembly and a heat reduction assembly according to the present invention.

With reference to FIG. 3, the toaster 10 also includes a carriage assembly, generally designated by reference numeral 60. The carriage assembly includes a support frame 68 and a lock frame 76 mounted upon a slide rod 62, wherein the support frame 68 is mounted vertically above the lock frame 76.

The slide rod 62 is vertically oriented and is mounted to the bottom frame 20 and to a rod strut 64 which in turn is fixed to the end wall 23. The slide rod 62 has a substantially constant diameter throughout its length, with the exception of a detent 66 formed at a position between the ends of the slide rod 62. The detent 66 is formed as a depression in the outer surface of the slide rod 62, and is preferably a circumferential groove about the slide rod 62.

The support frame 68 includes a generally planar support body oriented substantially parallel to the end wall 23 with appropriate apertures to receive the slide rod 62 with a sliding fit such that the support frame 68 may move vertically upon the slide rod 62.

The support frame 68 also includes one or more supports 69 upon which the food products rest. The supports 69 are horizontally oriented and extend through guide slots 70 in the end wall 23, on through the toasting cavities (see FIG. 2), and through guide slots 70 in the opposite end wall 22 (see FIG. 8). The guide slots 70 are vertically oriented and have a size slightly greater than that of the supports 69 such that the guide slots 70 restrict unwanted lateral movement of the supports 69, yet allow them to move vertically up and down with the support frame 68.

The vertical movement of the support frame 68 extends between a raised nontoasting position and a lowered toasting position. The raised nontoasting position is such that the food products will extend upwardly beyond the housing 12, and the lowered toasting position is such that the food products are fully received within the toasting cavities.

To restrict downward movement of the support frame 68, and thus define the lowered toasting position for the support frame 68, there is provided a support stop 72 mounted to the bottom frame 20 (see FIG. 2). The support stop 72 takes the form of a cantilevered element of spring steel having a free end vertically spaced from the bottom frame 20 and positioned to contact at least one of the supports 69.

To maintain the support frame 68 in the raised nontoasting position for receipt of food products, and to move the support frame 68 to the raised nontoasting position upon completion of a toasting cycle, there is provided a biasing coil 78 extending between the lock frame 76 and the rod strut 64 wherein vertical movement of the lock frame 76 due to biasing of the coil 78 will cause vertical movement of the support frame 68 along with the lock frame 76 to the raised nontoasting position.

The lock frame 76 includes a generally planar lock body oriented substantially parallel to the end wall 23 with appropriate apertures to receive the slide rod 62 with a sliding fit such that the lock frame 76 may move vertically upon the slide rod 62.

To releasably maintain the lock frame 76 in its lowered position in order to permit the support frame 68 to be placed in its lowered toasting position due to the force of gravity, the lock frame 76 also includes a releasable lock 80. The lock 80 is mounted to the lock frame 76 such that it engages with the detent 66 when the lock frame 76 is in the lowered position. The lock 80 is biased towards the slide rod 62 such that the lock 80 engages with the detent 66 automatically upon contact. The lock 80 thereby maintains the lock frame 76 in the lowered position.

The lock frame 76 also includes a heat activation handle 82 pivotally mounted to the lock frame 76 adjacent the upper ends thereof. The activation handle 82 includes an elongated handle portion 83 which extends beyond the exterior of the housing 12 and receives the heat activation grip 14. This allows the user to manually press the heat activation grip 14 downward, thus causing the lock frame 76 and the support frame 68 to move downward to their respective lowered positions.

With reference to FIG. 2, the toaster 10 also includes a heat activation assembly, generally designated by reference numeral 40. The heat activation assembly 40 includes an electrically insulating base 42 mounted to the bottom frame 20. In the embodiment shown, the base 42 extends vertically upward in a longitudinal plane, although other orientations, including horizontal, may be employed.

Fixed to the base 42 in spaced relation are a pair of supply contacts 44 which are connected to a power source. Also mounted to the base 42 are a pair of spring contacts 46 which are operably connected to the heating elements 26, 27 and 29 via appropriate wiring. The spring contacts 46 are formed of a spring metal and are mounted such that in their unbiased condition they are spaced from abutment with the supply contacts 44. As such, in their normal condition the spring contacts 46 do not complete a circuit with the supply contacts 44.

The base 42 also pivotally mounts an electrically insulative presser 48 in the form of a substantially rigid plate extending outwardly from the base 42 in a direction similar to that of the spring contacts 46. The presser 48 is pivoted to the base 42, and includes a pair of shoulders 49 which are in abutment with the spring contacts 46 at a position spaced from their connection to the base 42. As such, pivotal movement of the presser 48 toward the base 42 causes similar pivotal movement of the spring contacts 46.

Movement of the presser 48, and thus the spring contacts 46, is achieved by rotation of a pivot rod 54. The pivot rod 54 is pivotally mounted to the bottom frame 20 and includes an upstanding contact leg 55 at a first end thereof, and an upstanding carriage leg 56 at a second end thereof.

Rotation of the pivot rod 54 is achieved by moving the lock frame 76 to its lowered position. The lock frame 76 includes a pivot rod abutment 86 which engages and causes rotation of the carriage leg 56 when the lock frame 76 is moved to its lowered position. Rotation of the carriage leg 56 causes rotation of the pivot rod 54 and contact leg 55. Rotation of the contact leg 55 causes the presser 48 to be pivoted downward, bringing the spring contacts 46 into abutment with the supply contacts 44, thereby completing a circuit between the power source and the heating elements 26, 27 and 29.

Figure 4:
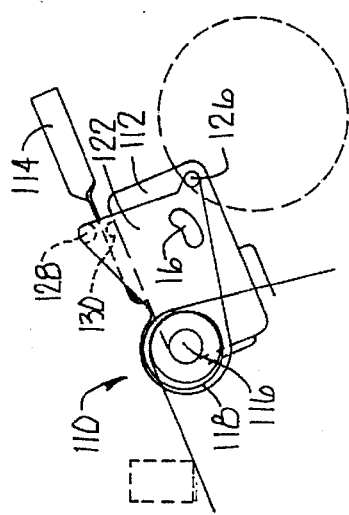
FIG. 4 is a front view of the heat reduction assembly of FIG. 3.

With reference to FIGS. 3 and 4, the toaster 10 also includes a heat reduction assembly, generally designated as reference numeral 110. The heat reduction assembly 110 includes a snap action switch 112 (such as Part No. TM03009 manufactured by C & K Components, Inc.) in parallel with a diode 120 (such as Part No. G3G-033 manufactured by General Instruments) and positioned between the power source and the heating elements 26 and 27 (see FIG. 8).

Figure 5:
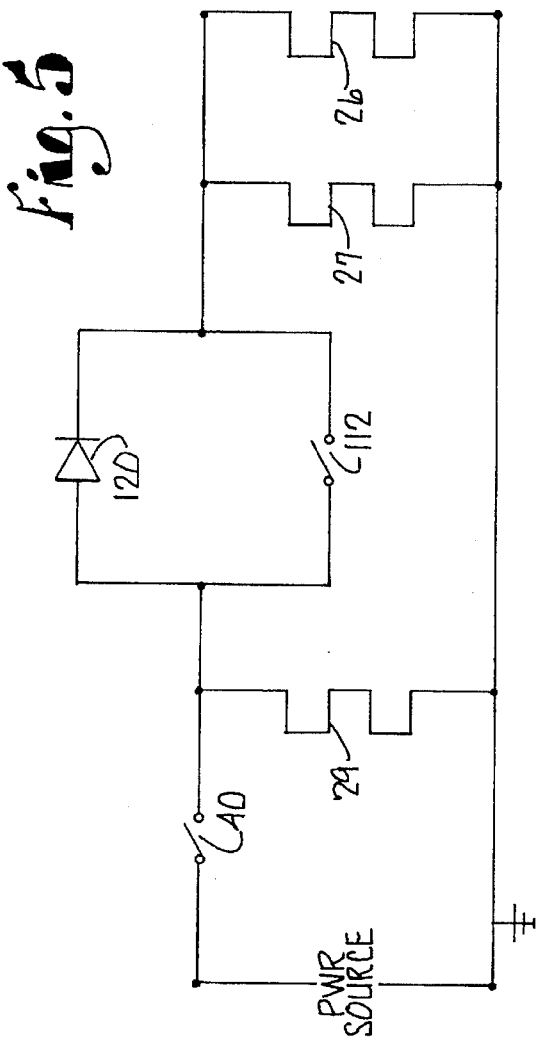
FIG. 5 is a simplified circuit diagram of the heat activation assembly, heat reduction assembly, and heating elements according to the present invention.

With reference to FIG. 5, when the heat activation assembly 40 is activated, power is supplied to heating element 29 mounted on the center wall 28, regardless of whether the snap action switch 112 is open or closed. In addition, when the snap action switch 112 is closed, power is supplied through the snap action switch 112, by-passing the diode 120, to heating elements 26 and 27 mounted on side walls 24 and 25. However, when the snap action switch 112 is open, power is supplied through the diode 120 to heating elements 26 and 27 of side walls 24 and 25 wherein the diode 120 reduces the voltage by approximately one-half.

Therefore, when the heat activation assembly 40 is activated and the snap action switch 112 is closed, the heating elements 26, 27 and 29 receive the full wattage from the power source and thus operate at full heat. In use, both sides of a food product are evenly toasted. When the heat activation assembly 40 is activated and the snap action switch 112 is open, heating element 29 receives the full wattage from the power source and thus operates at full heat, and heating elements 26 and 27 receive a reduced wattage from the power source and thus operate at a lower heat. In use, one side of a food product is toasted while the other side is only warmed. Thus, a sliced bagel can be toasted such that the "cut" side is toasted and the outside is only warmed.

As will become apparent, the snap action switch 112 is closed when in its normal position, and the snap action switch 112 is open when actuated.

With reference to FIGS. 3 and 4, the heat reduction assembly 110 also includes a heat reduction control 122 having a heat reduction grip 16 extending beyond the exterior of the housing 12. The heat reduction grip 16 extends through a guide slot 124 having a size slightly greater than that of the heat reduction grip 16. The guide slot 124 defines an original full heat position and a depressed reduced heat position of the heat reduction assembly 110.

The heat reduction control 122 is mounted on a pivot pin 116 which is fixed to the housing 12. The heat reduction control 122 is under torsional spring tension provided by a tension spring 118 such that the heat reduction control 122 is biased toward the original full heat position.

The heat reduction control 122 also has a switch member 126 extending toward the interior of the toaster 10 and into a mounting hole of the snap action switch 112, thus engaging the snap action switch 112. The snap action switch 112 is also mounted on the pivot pin 116 such that pivotal movement of the heat reduction control 122 about the pivot pin 116 causes pivotal movement of the snap action switch 112. Therefore, the snap action switch 112 follows the biased movement of the heat reduction control 122 toward the original full heat position.

The heat reduction assembly 110 also includes an actuator arm 114 which consists of a twisted metal band having a horizontally oriented portion and a vertically oriented portion. The horizontal portion of the actuator arm 114 is pivotally connected to the snap action switch 112 such that in its unbiased condition it does not depress the snap pin 130 of the snap action switch 112 to actuate the snap action switch 112. The horizontal portion of the actuator arm 114 abuts an actuator member 128 of the heat reduction control 122 which limits the pivotal movement of the actuator arm 114 away from the snap action switch 112. The vertical portion of the actuator arm 114 extends outwardly from the snap action switch 112.

Figure 6:
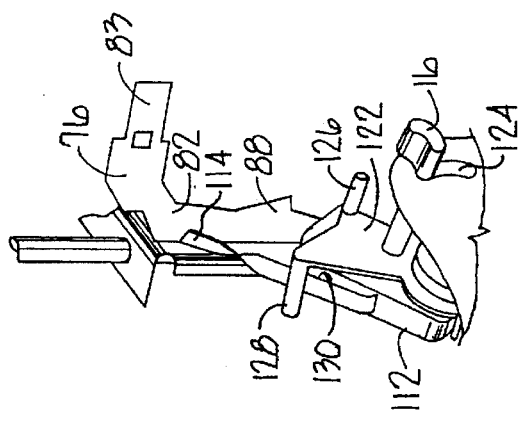
FIG. 6 is a perspective view of the carriage assembly and the heat reduction assembly of FIG. 3 shown in the full heat toasting position.

With reference to FIG. 6, to toast a food product in the full heat mode such that both sides of the food product are evenly toasted, a user lowers the heat activation grip 14 of the carriage assembly 60 downward until the lock frame 76 latches in a locked position, thus activating the heat activation assembly 40. In this mode, the actuator arm 114 does not actuate the snap action switch 112, and the snap action switch 112 remains in the closed position. Thus, the heating elements 26, 27 and 29 operate at full heat so as to evenly toast both sides of the food product.

Figure 7:
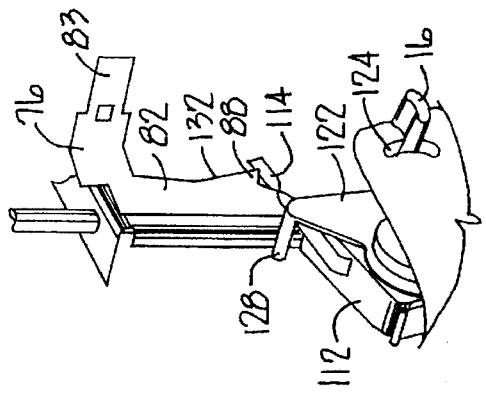
FIG. 7 is a perspective view of the carriage assembly and the heat reduction assembly of FIG. 3 shown in the reduced heat toasting position.

With reference to FIG. 7, to toast a food product in the reduced heat mode such that one side of the food product is toasted more than the other side, a user lowers the heat activation grip 14 of the carriage assembly 60 downward until the lock frame 76 latches in a locked position, thus activating the heat activation assembly 40. The user also depresses the heat reduction grip 16 downward which causes the heat reduction control 122, and thus the snap action switch 112, to pivot about the pivot pin 116. The actuator arm 114 follows the snap action switch 112 and moves along an angled edge 132 of the lock frame 76 and latches into a notch 88 of the lock frame 76. When the user releases pressure on the heat reduction grip 16, the tension of the tension spring 118 returns the heat reduction control 122 and the snap action switch 112 toward its original position. The actuator arm 114, now latched into the notch 88 of the lock frame 76, cannot follow the snap action switch 112. This forces the snap action switch 112 to actuate and switch to the open position. Thus, heating element 29 operates at full heat and heating elements 26 and 27 operate at a lower heat so as to toast one side of the food product more than the other.

At the end of the toasting cycle, the lock frame 76 returns to the raised nontoasting position. The lock frame 76 thus disengages the actuator arm 114, allowing the heat reduction control 122, snap action switch 112, and actuator arm 114 to return to the original full heat position.

Accordingly, a user may also use the invention by first depressing and holding the heat reduction grip 16 in the depressed reduced heat position, and then lowering the heat activation grip 14 to the lowered toasting position. This will also start the reduced heat mode.

With reference to FIG. 2, the toaster 10 also includes a lock release assembly, generally designated as reference numeral 90. The lock release assembly 90 provides for automatic disengagement of the carriage assembly 60 upon reaching a desired time and/or temperature. The lock release assembly 90 includes a strip mount 92 mounted to the bottom frame 20. The connection of the strip mount 92 to the bottom frame 20 is resiliently pivotal, with the orientation of the strip mount 92 with respect to the bottom frame 20 controlled by a darkness control handle 94. The darkness control handle 94 extends outward beyond the housing 12 and receives the darkness control grip 18.

The strip mount 92 has fixed thereto a bimetallic strip 96. The free end of the bimetallic strip 96 has mounted thereto a release pin 98 which extends through the end wall 23. The release pin 98 is freely moveable through the end wall 23 such that the position of the free end is dependent upon the position of the free end of the bimetallic strip 96. The bimetallic strip 96 is mounted within the associated cavity such that the heat of the heating elements 26, 27 and 29 causes the bimetallic strip 96 to bend in a known manner, thus causing a known movement of the free end of the release pin 98. As may be envisioned, altering the orientation of the strip mount 92 by use of the darkness control grip 18 alters the position of the release pin 98 for a given temperature.

With reference to FIG. 3, the lock release assembly 90 also includes a drop frame 100 mounted on the slide rod 62 and oriented substantially parallel to the end wall 23 with an appropriate aperture to slidingly receive the slide rod 62 with a sliding fit such that the drop frame 100 may move vertically upon the slide rod 62. The drop frame 100 is mounted vertically above the support frame 68 and the lock frame 76. The drop frame 100 includes a pin abutment 102. The release pin 98 and pin abutment 102 are oriented and configured such that the free end of the release pin 98 extends vertically below and longitudinally further than the pin abutment 102 when the bimetallic strip 96 is in the "cold" position. As such, the drop frame 100 is maintained in its up position. However, upon activation of the heating elements 26, 27 and 29 and generation of a predetermined amount of heat, the bimetallic strip 96 changes position. In this position, the free end of the release pin 98 moves longitudinally inward of the pin abutment 102, and thus ceases to support the drop frame 100. When this occurs, the drop frame 100 falls under the force of gravity to a down position, abutting upon the support frame 68. This contact serves to pivot the lock 80 out of engagement with the detent 66. As such, the lock frame 76 is not prevented from upward movement, and begins to move upward under the force of the coil 78. The lock frame 76 moves into abutment with the support frame 68, thus drawing the support frame 68 upwards also. Additionally, the drop frame 100 is in abutment with the support frame 68, and is also drawn upward. Thus, the carriage assembly 60 automatically resets to the raised nontoasting position, causing the food products received within the cavities to be moved partially outward thereof to be manually removed by the user.

While the above invention has been described with regard to a particular embodiment, it should be apparent to those skilled in the art that various modifications are possible.

For example, the diode 120 could be eliminated such that only the snap action switch 112 is positioned between the power source and the heating elements 26 and 27. As such, when the heat activation assembly 40 is activated and the snap action switch 112 is closed, the heating elements 26, 27, and 29 would receive the full wattage from the power source and thus operate at full heat. In use, both sides of a food product would be evenly toasted. When the heat activation assembly 40 is activated and the snap action switch 112 is open, heating element 29 would receive the full wattage from the power source and thus operate at full heat, and heating elements 26 and 27 would receive no power at all. In use, one side of a food product would be toasted while the other side would not.

Additionally, the diode 120 used to reduce the wattage from the power source could be replaced with one or more other electrical components to modify the electrical circuit between the power source and the heating elements 26, 27 and 29.

Also, the electrical circuit could be modified such that, in the reduced heat mode, heating element 29 mounted on the center wall 28 would receive a reduced wattage from the power source, and heating elements 26 and 27 mounted on side walls 24 and 25 would receive the full wattage from the power source.

In addition, various configurations of the engagement between the carriage assembly and the heat reduction assembly are possible.

It is to be understood that while certain forms of this invention have been illustrated and described, the invention is not limited to the specific forms or arrangement of parts described thereto, except insofar as such limitations are included in the following claims.

What is claimed and desired to be secured by Letters Patent is as follows:

1. An electric appliance for toasting bagels, bread, and other food products, said toaster having a full heat mode and a reduced heat mode, said full heat mode for toasting said food products such that both sides are evenly toasted, said reduced heat mode for toasting said food products such that one side is toasted more than the other side, said toaster automatically resetting to said full heat mode at the end of a toasting cycle, said toaster comprising:

(a) at least one cavity for receiving said food products;

(b) a plurality of heating elements for toasting said food products;

(c) a heat activation assembly electrically connected to a power source and to said heating elements wherein said heat activation assembly completes a circuit between said power source and said heating elements when said heat activation assembly is activated, said power source thereby energizing said heating elements;

(d) a carriage assembly movable between a nontoasting position and a toasting position, said carriage assembly operably connected to said heat activation assembly wherein said carriage assembly activates said heat activation assembly when said carriage assembly is in said toasting position; and (e) a heat reduction assembly movable between a full heat position and a reduced heat position, said heat reduction assembly electrically connected to said heat activation assembly wherein all of said heating elements operate at full heat when said heat activation assembly is activated and said heat reduction assembly is in said full heat position, and wherein selected heating elements operate at full heat and other selected heating elements operate at a lower heat when said heat activation assembly is activated and said heat reduction assembly is in said reduced heat position.

2. An electric appliance for toasting bagels, bread, and other food products as in claim 1 wherein said heat reduction assembly includes:

(a) a heat reduction control movable between said full heat position and said reduced heat position;

(b) a snap action switch operably connected to said heat reduction control and having an original position and an actuated position, said snap action switch electrically positioned between said power source and said other selected heating elements wherein said other selected heating elements operate at full heat when said snap action switch is in said original position and wherein said other selected heating elements operate at a lower heat when said snap action switch is in said actuated position; and (c) an actuator arm operably connected to said snap action switch, said actuator arm actuating said snap action switch when said heat activation assembly is activated and said heat reduction control is in said reduced heat position.

3. An electric appliance for toasting bagels, bread, and other food products as in claim 2 wherein said heat reduction control and said snap action switch are mounted on a pivot pin wherein said heat reduction control, and thus said snap action switch, pivot about said pivot pin as said heat reduction control is moved to said reduced heat position, said heat reduction control being under torsional spring tension such that said heat reduction control, and thus said snap action switch, are biased to said full heat position.

4. An electric appliance for toasting bagels, bread, and other food products as in claim 3 wherein said actuator arm is engaged by said carriage assembly when said carriage assembly is in said toasting position and said heat reduction control is in said reduced heat position, said engaged actuator arm thereby actuating said snap action switch upon said biasing of said heat reduction control and said snap action switch.

5. An electric appliance for toasting bagels, bread, and other food products as in claim 4 wherein said carriage assembly returns to said nontoasting position at the end of a toasting cycle, thereby disengaging said actuator arm such that said heat reduction control and said snap action switch return to said full heat position.

6. An electric appliance for toasting bagels, bread, and other food products comprising:

(a) at least one cavity for receiving said food products;

(b) a plurality of heating elements for toasting said food products;

(c) a heat activation assembly electrically connected to a power source and to said heating elements;

(d) a carriage assembly operably connected to said heat activation assembly and movable between a raised position and a lowered position; and (e) a heat reduction assembly electrically connected to said heat activation assembly and movable between an original position and a depressed position;

(g) said carriage assembly activating said heat activation assembly when said carriage assembly is moved to said lowered position;

(h) said heat activation assembly completing a circuit between said power source and said heating elements when said heat activation assembly is activated, said power source thereby supplying a wattage to said heating elements;

(i) said heat reduction assembly modifying said circuit between said power source and said heating elements such that a reduced wattage is supplied to selected heating elements when said heat reduction assembly is moved to said depressed position;

(j) said heat reduction assembly automatically resetting to said original position at the end of a toasting cycle.

7. An electric appliance for toasting bagels, bread, and other food products as in claim 6 wherein said heat reduction assembly reduces said wattage supplied to said selected heating elements by opening said circuit between said power source and said selected heating elements such that said wattage is not supplied to said selected heating elements.

8. An electric appliance for toasting bagels, bread, and other food products as in claim 6 wherein said toaster includes at least two side walls and at least one center wall, said walls each mounting a heating element such that said wattage is supplied to said heating element of said center wall and said reduced wattage is supplied to said heating elements of said side walls when said heat activation assembly is activated and said heat reduction assembly is in said depressed position.

9. An electric appliance for toasting bagels, bread, and other food products as in claim 6 wherein said heat reduction assembly includes:

(a) a heat reduction control movable between said original position and said depressed position;

(b) a switch operably connected to said heat reduction control and having an original position and an actuated position; and (c) an actuator arm operably connected to said switch;

(d) said heat reduction control operably connected to a tension spring which biases said heat reduction control, and thereby said switch and said actuator arm, to said original position.

10. An electric appliance for toasting bagels, bread, and other food products as in claim 9 wherein said actuator arm is engaged by said carriage assembly when said carriage assembly is in said lowered position and said heat reduction assembly is in said depressed position, said actuator thereby depressing a snap pin of said switch upon said biasing of said switch, said depressing of said snap pin causing said switch to actuate, thus modifying said circuit between said power source and said selected heating elements such that said reduced wattage is supplied to said selected heating elements.

11. An electric toaster appliance for toasting bagels, bread, and other food products as in claim 10 wherein said carriage assembly resets to said raised position upon completion of a toasting cycle, said carriage assembly thereby disengaging said actuator arm such that said snap pin of said switch is released and said heat reduction assembly automatically resets to said original position.

12. An electric appliance for toasting bagels, bread, and other food products comprising:

(a) at least one cavity for receiving said food products;

(b) a plurality of heating elements for toasting said food products;

(c) a heat activation assembly having an open position and a closed position, said heat activation assembly coupled to a power source and to said heating elements wherein said heat activation assembly completes a circuit between said power source and said heating elements when said heat activation assembly is in said closed position, said power source thereby energizing said heating elements;

(d) a carriage assembly having a nontoasting position and a toasting position, said carriage assembly operably connected to said heat activation assembly wherein said carriage assembly switches said heat activation assembly to said closed position when said carriage assembly is in said toasting position; and (e) a heat reduction assembly having an open position and a closed position, said heat reduction assembly coupled to said heat activation assembly and to selected heating elements wherein said selected heating elements operate at a full heat when said heat activation assembly is closed and said heat reduction assembly is closed, and wherein said selected heating elements operate at a lower heat when said heat activation assembly is closed and said heat reduction assembly is open;

(f) said heat reduction assembly automatically resetting to said closed position at the end of a toasting cycle.

13. An electric appliance for toasting bagels, bread, and other food products as in claim 12 wherein said selected heating elements are not energized when said heat activation assembly is closed and said heat reduction assembly is open.

14. An electric appliance for toasting bagels, bread, and other food products as in claim 12 wherein said heat reduction assembly is positioned between said power source and said selected heating elements, said power source supplying a wattage to said heating elements wherein said selected heating elements receive said wattage when said heat reduction assembly is in said closed position and wherein said selected heating elements receive a reduced wattage when said heat reduction assembly is in said open position.

15. An electric appliance for toasting bagels, bread, and other food products as in claim 14 wherein said heat reduction assembly includes a switch having a closed position and an open position in parallel with a diode, said power source supplying said wattage through said switch to said selected heating elements when said switch is in said closed position, said power source supplying said wattage through said diode to said selected heating elements when said switch is in said open position such that said diode reduces said wattage supplied to said selected heating elements.

16. An electric appliance for toasting bagels, bread, and other food products as in claim 15 wherein said switch automatically resets to said closed position at the end of a toasting cycle.

17. An electric appliance for toasting bagels, bread, and other food products, said toaster having a full heat mode and a reduced heat mode, said full heat mode for toasting said food products such that both sides are evenly toasted, said reduced heat mode for toasting said food products such that one side is toasted more than the other side, said toaster automatically resetting to said full heat mode at the end of a toasting cycle, said toaster comprising:

(a) at least one cavity for receiving said food products;

(b) a plurality of heating elements for toasting said food products;

(c) means for connecting said heating elements to a power source to thereby energize and heat said heating elements, said power connection means having an open position and a closed position;

(d) a carriage assembly movable between a nontoasting position and a toasting position, said carriage assembly operably connected to said power connection means wherein said carriage assembly closes said power connection means when said carriage assembly is in said toasting position; and (e) means for reducing said heat of selected heating elements, said heat reduction means having a full heat position and a reduced heat position, said heat reduction means electrically connected to said power connection means wherein said selected heating elements operate at said reduced heat when said power connection means are in said closed position and said heat reduction means are in said reduced heat position.

18. An electric appliance for toasting bagels, bread, and other food products as in claim 17 wherein said power source does not energize and heat said selected heating elements when said heat reduction means is in said reduced heat position.

19. An electric appliance for toasting bagels, bread, and other food products as in claim 17 wherein said heat reduction means includes:

(a) means for selectively moving said heat reduction means between said full heat position and said reduced heat position;

(b) a switch operably connected to said selection means, said switch having an open position and a closed position wherein said toaster operates in said full heat mode when said switch is in said closed position and wherein said toaster operates in said reduced heat mode when said switch is in said open position;

(c) means for activating said switch; and (d) means for biasing said selection means to said full heat position.

20. An electric appliance for toasting bagels, bread, and other food products as in claim 19 wherein said selection means and said switch are pivotally connected to a pivot pin such that said selection means and said switch pivot about said pivot pin as said selection means is moved from said full heat position to said reduced heat position, said selection means operably connected to said biasing means such that said selection means, and thus said switch, are biased to said full heat position.

21. An electric toaster for toasting bagels, bread, and other food products as in claim 19 wherein said carriage assembly engages said switch activation means when said carriage assembly is in said toasting position and said heat reduction means are in said reduced heat position, said switch activation means thereby opening said switch, said carriage assembly returning to said nontoasting position at the end of a toasting cycle and disengaging said switch activation means, said switch activation means thereby closing said switch.

* * * * *